(12) United States Patent
Cai et al.

(10) Patent No.: US 8,577,192 B2
(45) Date of Patent: Nov. 5, 2013

(54) TUNABLE OPTICAL FILTERS WITH MULTIPLE PORTS

(75) Inventors: Ming Cai, Fremont, CA (US); Ruibo Wang, Oak Park, CA (US); Ming Wu, Pleasonton, CA (US); Xuefeng Yue, San Jose, CA (US)

(73) Assignee: Oclaro (North America Inc.), San Jose, CA (US)

( * ) Notice: Subject to any disclaimer, the term of this patent is extended or adjusted under 35 U.S.C. 154(b) by 254 days.

(21) Appl. No.: 12/804,627

(22) Filed: Jul. 26, 2010

(65) Prior Publication Data

US 2012/0020617 A1 Jan. 26, 2012

(51) Int. Cl.
*G02B 6/32* (2006.01)
(52) U.S. Cl.
USPC .......................................................... 385/33
(58) Field of Classification Search
USPC .......................................................... 385/33
See application file for complete search history.

(56) References Cited

U.S. PATENT DOCUMENTS

| | | | |
|---|---|---|---|
| 4,923,270 A | 5/1990 | Carter | |
| 6,654,157 B2 | 11/2003 | Islam et al. | |
| 6,704,487 B2 | 3/2004 | Parhami et al. | |
| 6,798,551 B2 | 9/2004 | Gu | |
| 6,891,676 B2 | 5/2005 | Ford et al. | |
| 6,992,777 B2 | 1/2006 | Han et al. | |
| 7,016,098 B2 | 3/2006 | Giles et al. | |
| 7,362,930 B2 | 4/2008 | Davis et al. | |
| 7,440,648 B2 | 10/2008 | Oikawa et al. | |
| 7,720,329 B2 | 5/2010 | Presley et al. | |
| 2001/0038730 A1 | 11/2001 | Sorin et al. | |
| 2002/0005970 A1 | 1/2002 | Lang | |
| 2004/0156581 A1* | 8/2004 | Golub et al. | 385/18 |
| 2006/0228070 A1* | 10/2006 | Davis et al. | 385/16 |
| 2006/0257091 A1* | 11/2006 | Tabuchi et al. | 385/132 |
| 2009/0103861 A1 | 4/2009 | Presley et al. | |
| 2010/0150563 A1 | 6/2010 | Nakajima | |

FOREIGN PATENT DOCUMENTS

CN 101384933 3/2009
WO WO 2007/078415 A2 7/2007

OTHER PUBLICATIONS

PCT/US2011/045424 International Search Report (Dec. 5, 2011).
PCT/US2010/002449 International Search Report (Nov. 2, 2010).
PCT/US2011/059448 International Search Report (Apr. 4, 2012).
Chinese Application No. 201110210059.X First Office Action (Aug. 17, 2012) (English translation attached).

\* cited by examiner

*Primary Examiner* — Ryan Lepisto
*Assistant Examiner* — Jerry Blevins
(74) *Attorney, Agent, or Firm* — Fenwick & West LLP

(57) ABSTRACT

Described are tunable multiport optical filters that filter systems with many optical channels in a convenient and cost-effective manner. The tunable multiport optical filters of the invention are simple in design and have few optical components. The basic elements are a dispersion element and a rotating mirror. With properly arranged arrays of input and output optical fibers, individual wavelength components from a selected input beam are spatially separated and steered by the rotating mirror to selected output locations. The optical properties from the selected components may be measured by one or more photodetectors. The filters are also useful for selecting and routing optical signals.

12 Claims, 5 Drawing Sheets

X-AXIS CROSS-SECTION

Y-AXIS CROSS-SECTION

X-AXIS CROSS-SECTION - UPPER PORT

X-AXIS CROSS-SECTION - LOWER PORT

TUNABLE OPTICAL FILTERS WITH MULTIPLE PORTS

FIELD OF THE INVENTION

The field of the invention is wavelength selective devices using tunable optical filters.

BACKGROUND OF THE INVENTION

There exists a well known category of optical devices that perform optical filtering and can be tuned to select a narrow band of wavelengths from a wider wavelength spectrum. These devices are used in a variety of optical systems. Of specific interest are wavelength division multiplexed systems that operate typically over wavelength bands of tens of nanometers. These systems require optical performance monitoring (OPM) to ensure that signal power, signal wavelength, and signal to noise ratios (OSNR) are within specified limits. Other applications for tunable optical filters, inter alia, are for optical noise filtering, noise suppression, wavelength division demultiplexing, and optical routing.

Complex state of the art DWDM systems have many channels operating across a wide optical spectrum. To monitor these channels requires many measurements. Monitoring equipment that reduces the time and complexity of performing these measurements can significantly increase overall system performance and reduce system costs.

Other applications using wavelength selective devices in WDM systems are for selectively routing channels in large optical systems.

STATEMENT OF THE INVENTION

We have developed tunable multiport optical devices that perform various optical functions involving multiple optical channels in a convenient and cost-effective manner. The tunable multiport optical devices of the invention are simple in design and have few optical components. The basic elements are a dispersion element and a rotating mirror operating with arrays of input and output optical fibers. Preferred applications include optical channel monitoring (OCM) and optical switches for routing between multiple channels.

BRIEF DESCRIPTION OF THE DRAWING

The invention may be better understood when considered in conjunction with the drawing in which.

DETAILED DESCRIPTION OF THE INVENTION

Figure 1:
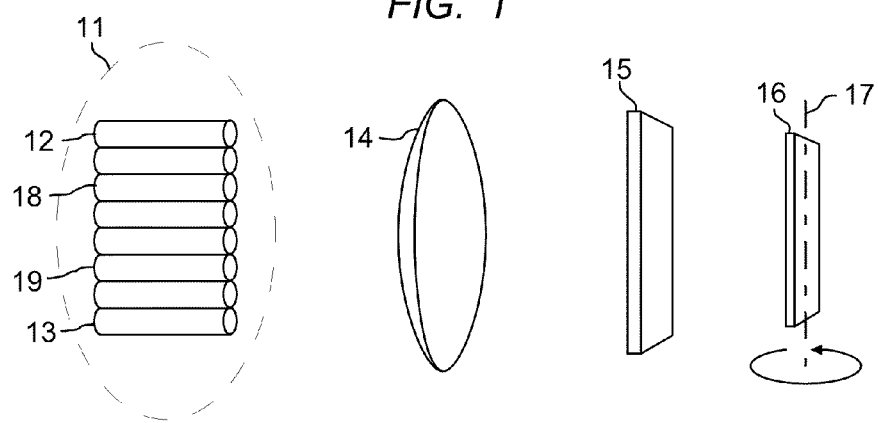
FIG. 1 is a perspective view showing a first embodiment of a tunable multi-port optical filter according to the invention.

FIG. 1 shows a first embodiment of the invention with an array of input and optical fibers shown at 11, and with collimating lens 14, dispersive element 15, and tuning mirror 16. The tuning mirror rotates around axis 17. This figure, and subsequent figures, is not drawn to scale. Optical elements are located and spaced according to their functions and properties. These are known in the art. The devices will be described using x- and y-axial notations for directions around the z-axis, which is the direction of light propagation through the device. Reference below to the x-plane or the y-plane will be understood to mean the x-z or y-z planes. Reference to x-direction or y-direction will be understood to mean directions normal to the y-z and x-z planes respectively. Reference in the figures to x-axis cross section or y-axis cross section is intended to mean a view of the x-z plane or the y-z plane respectively.

The embodiments shown are described in the context of OPM applications. However, it should be understood that the basic devices described here are also useful as wavelength selective devices for routing selected WDM channels.

Figure 2:
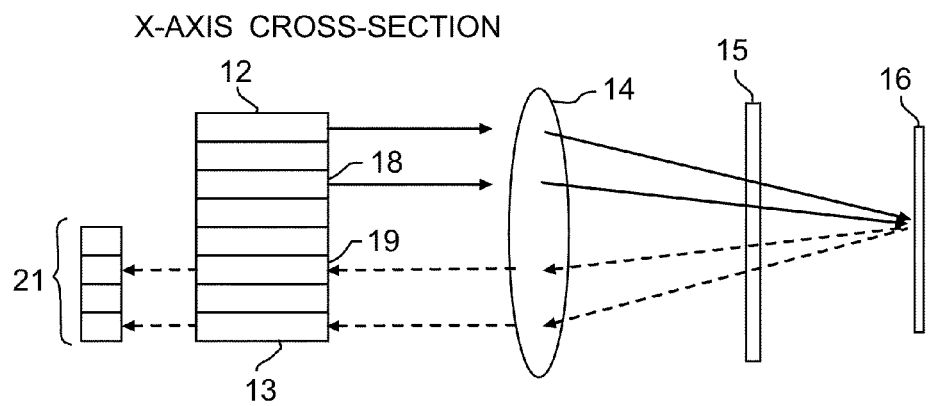
FIG. 2 is a schematic illustration the operation of the tunable multiport optical filter of FIG. 1, showing ray diagrams for the x- and y-directions of the device.
Figure 2:
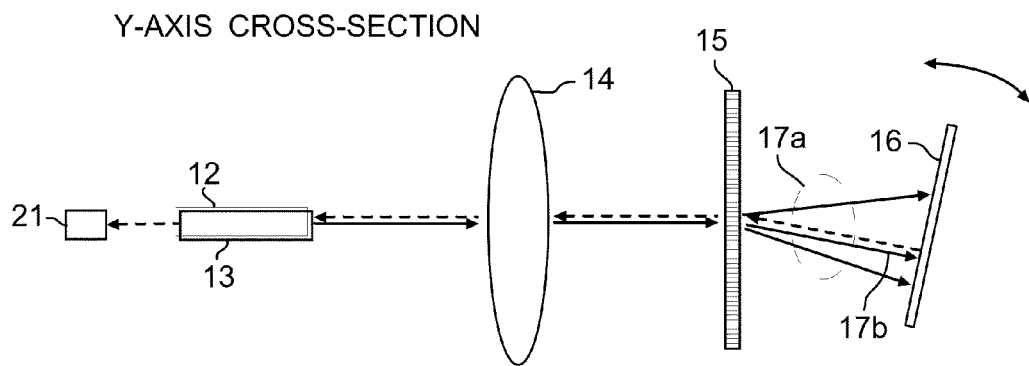

The specific optics as represented by ray optics, for the embodiment of FIG. 1, are illustrated in FIG. 2. The input fiber array 11 is composed by 8 fibers which are tightly aligned in parallel, i.e., the optical fibers have minimal spacing and are aligned with the centers of the optical fibers on a common axis, as shown the x-axis. The signal beam to be monitored, typically a tapped portion of the signal from one channel the network, is coupled to input fiber 12. It passes through collimating lens 14 to collimate the Gaussian input beam to collimated light with suitable diameter. The collimated beam is incident onto dispersion element 15. In the x-axis cross section (top portion of FIG. 2) the beam is not dispersed. In the y-axis cross section (bottom portion of FIG. 2) the light beam from the grating is dispersed into the wavelength components of the signal beam. The wavelength components 17a are diffracted from the dispersion element in different directions depending on the wavelength of the beam components. A rotating mirror 16 is positioned as shown to intersect the dispersed beam. The mirror rotates on an x-axis.

Only one of the beam components (wavelengths), in this case components represented by arrow 17b, will be normal to the mirror 16. That beam component is reflected back along a path represented by the dashed line. Other beam components, like the two shown in the y-axis cross section of FIG. 2, will "walk-off" the mirror. The selected beam component, 17b, is diffracted by element 15 by the same angle as before and propagates to output fiber 13. The intensity of beam component 17b is measured by photodiode 21, coupled as shown to the output fiber 13. Input optical fiber 12 is shown in this view just to orient the viewer to the fact that the optical fibers in the array are stacked in the y-direction.

When mirror 16 is rotated, another beam component will be normal to the mirror 16 and will be selectively reflected back through output fiber 13 and its properties measured. In this manner, the wavelength spectrum of the input beam to optical fiber 12 may be scanned and the properties of all of its beam components can be measured. Thus the device achieves wavelength selection and provides an optical filter. The wavelength of the filter is tuned by the rotational orientation of mirror 16.

It will be recognized that the optical paths in the x-axis cross section of FIG. 2 are unchanged by the tilt of mirror 16. This is due to the fact that lens 14 focuses all input beams on the axis of rotation of the mirror. The reflecting surface along the tilt axis remains essentially fixed when the mirror is tilted.

The orientation of the mirror may be changed by an actuator or several actuators. The mirror may comprise a micro electro-mechanical system (MEMS), or comprise a discrete mirror driven by motors or any other types or actuators. The tilt of the mirror may be changed in one axis, or more than one axis.

Another WDM channel may be input as an input beam to optical fiber 18. The output of the beam components from this channel are directed through output optical fiber 19 and measured by the associated photodetector as shown in the top portion of FIG. 2.

It will be appreciated by those skilled in the art that, while the array of input optical fibers, e.g., 12 and 18, and the array of output fibers 13 and 19 are shown closely packed and precisely aligned, the device input optical fibers and the device output optical fibers may have any length and be routed in any suitable fashion to other components/couplers in the system. For example, the photodetectors 21 are shown as an array of elements receiving light beams directly from the closely packed array of output optical fibers. However, the optical fiber 13 may route an optical signal to a photodiode non-aligned with respect to the output array of optical fibers.

The detection device may take any of a variety of forms, and measure a variety of optical beam properties. The arrangement shown is simple and useful for illustration. If the input beams are suitably time division multiplexed, a single detection device may be used. Alternatively a single spectrum analyzer may be used as the detection device.

In this description the optical elements are shown as separate elements. These represent functional elements. The physical elements providing these functions may, in some cases, be combined as a single module. For example, a grating may have a reflective surface or an attached or integral lens.

Figure 3A:
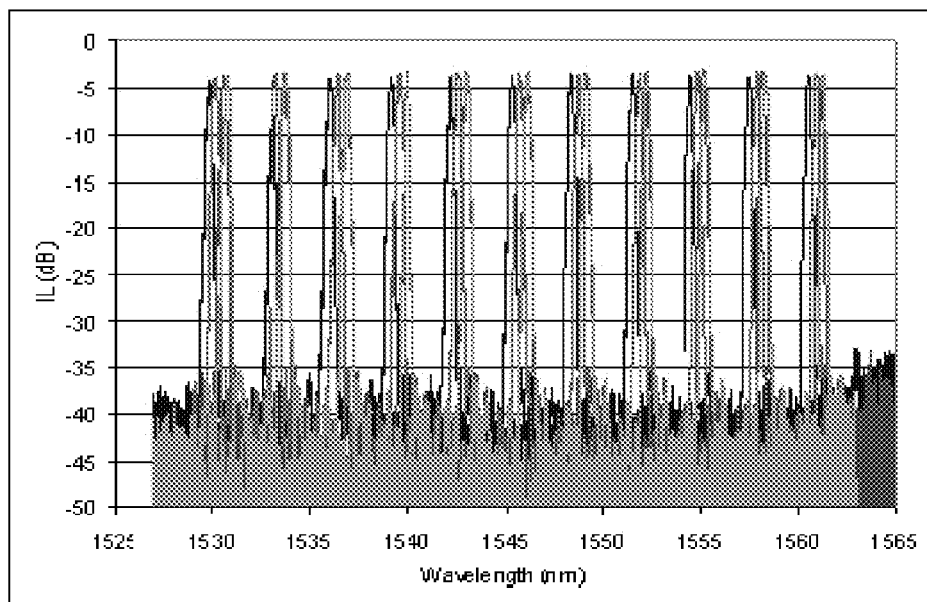
FIGS. 3A and 3B show performance data for the embodiment of FIG. 1.
Figure 3B:
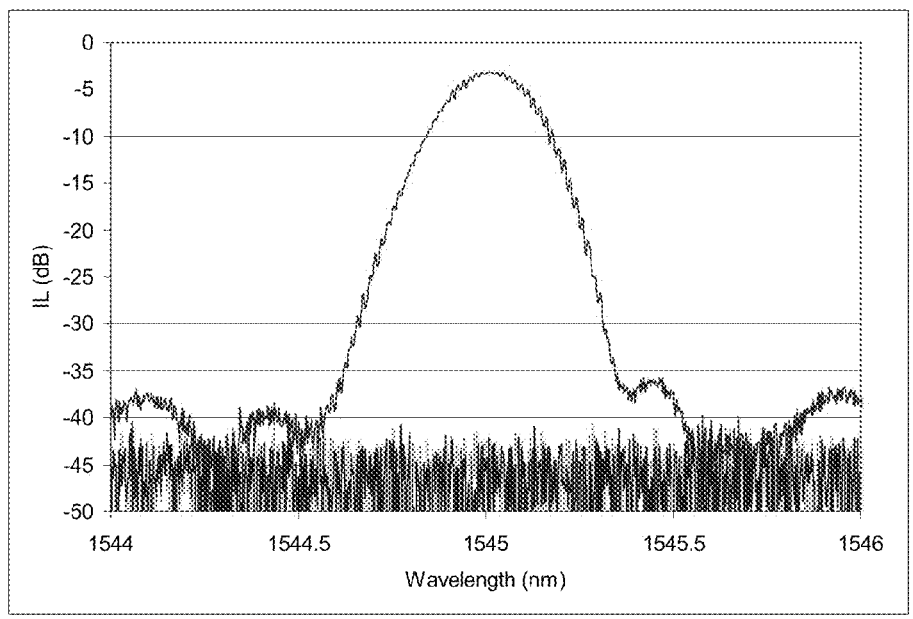

FIGS. 3A and 3B provide test results of a device built with the fiber array and optical figuration of FIGS. 1 and 2. The filter is characterized by optical spectrum analyzer (osa). The light from a broad band light source is couple to the input fiber. The output fiber is connected to the osa, and the spectrum is taken. The spectrum shows that the filter produces high transmission in a narrow band. The location of the passed band (filter wavelength) may be changed electronically as described by actuating the MEMS mirror control.

In the embodiments of FIGS. 1 and 2, the device is shown with a 1×8 fiber array, and can achieve 4 ports (4 tunable filters), in which all the ports are tuned simultaneously. In this array, all of the optical fibers are aligned in a single plane. The number of fibers may vary but typically will be an even number to produce pairs of fibers, each pair with an input fiber and an output fiber.

Figure 4:
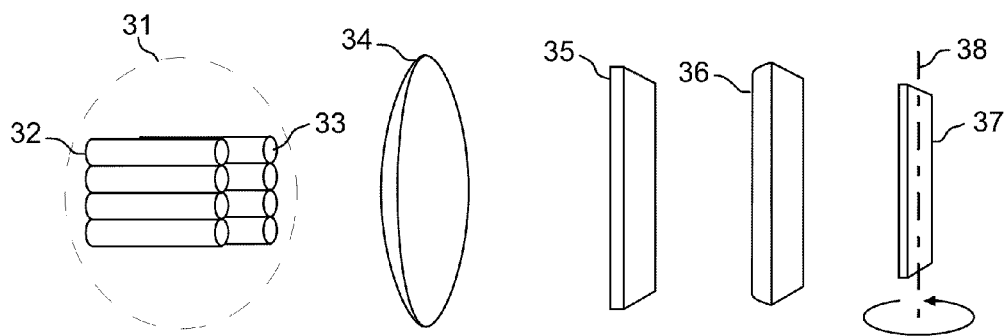
FIG. 4 is a perspective view showing a second embodiment of a tunable multi-port optical filter according to the invention.
Figure 5:
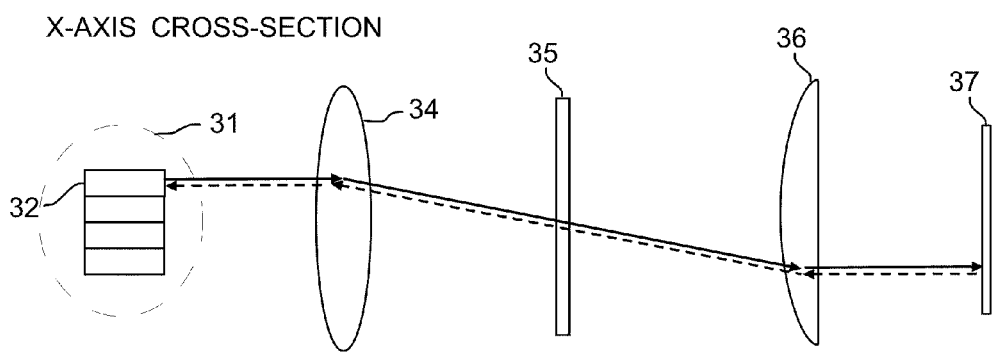
FIG. 5 is a schematic illustration similar to that of FIG. 2, showing ray diagrams for the x- and y-directions in the device of the second embodiment.
Figure 5:
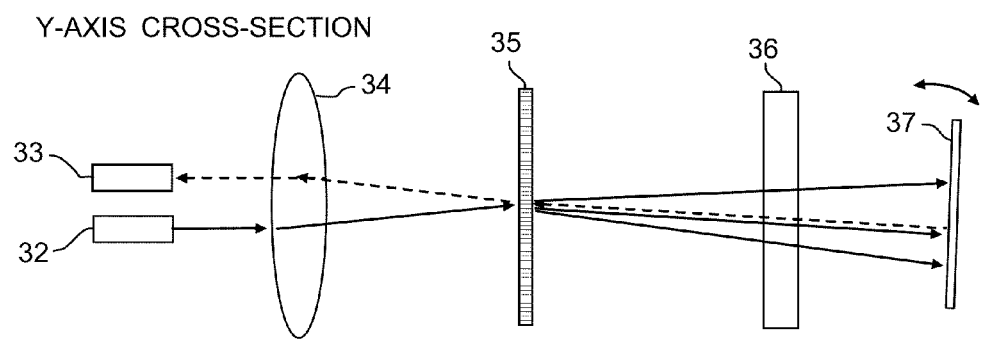

The fiber array may have other formats. In FIGS. 4 and 5, the fiber array 31 is arranged in a 2×4 format to achieve a 4-port tunable filter. FIGS. 4 and 5 also show a different optical configuration. In the system of FIGS. 4 and 5, two lenses are used. The first, 34, is a spherical or aspherical lens used to collimate the beam in both x- and y-directions. The second lens, 36, is a cylindrical lens. It focuses the input beam from input optical fiber 32 in the y-direction but does not focus the beam in x-direction. In this optical configuration, the returning light beam returns to the associated output optical fiber 33 with same y-direction coordinates. For simplicity in the illustration the photodetectors have been omitted.

Figure 6:
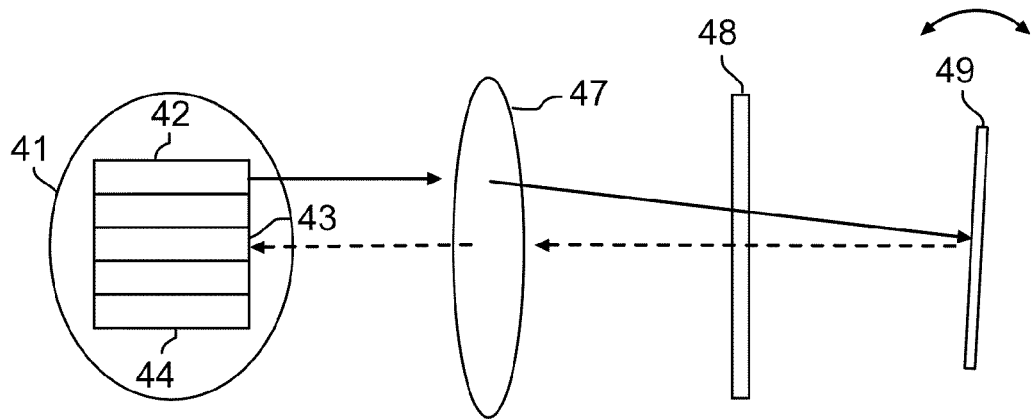
FIG. 6 is a schematic illustration similar to that of FIG. 2, showing ray diagrams for the x-direction in a device of another embodiment.
Figure 6:
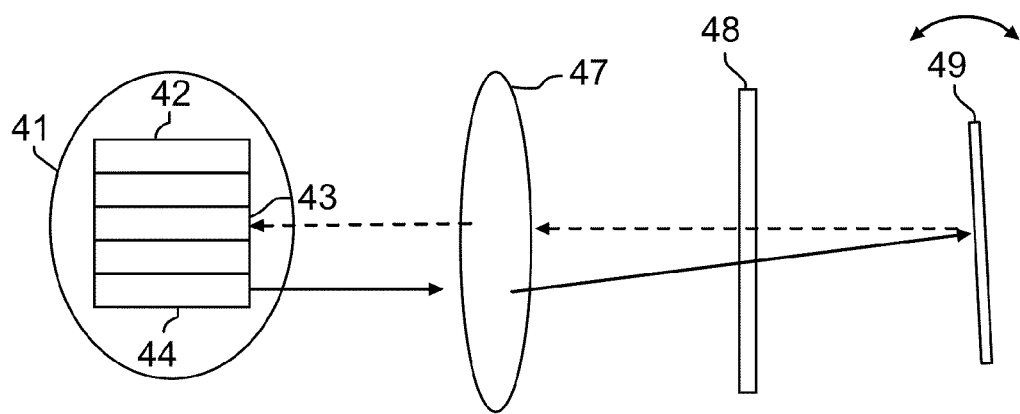

In the systems described it is not required that the ports be tuned simultaneously. If the mirror orientation can be controlled in 2 axes, i.e., both x- and y-, then the ports can be read in series, i.e., there will be one input fiber and a number of output fibers. In FIG. 6 the optics are configured similarly as in FIGS. 1 and 2. However, the fiber array 41 is a 1×5 format array. When the mirror is rotated to the first angle along x axis, light from the upper input fiber 42 is coupled back to output fiber 43. When the mirror is rotated to the second angle, shown in the lower portion of FIG. 6, light from the lower input fiber 44 is coupled back to output fiber 51. In this method, multiple outputs from different input fibers 42-45 can be read in series. Note that the mirror still rotates also along the y-axis to select the different wavelengths.

It should be evident that the number of optical fibers in a multiport optical filter according to the invention may vary widely. In embodiments like FIGS. 2 and 4 there will typically be at least three input optical fibers and three output optical fibers, producing a three port device. In an embodiment like FIG. 6 there will preferably be at least three input optical fibers, producing a three port device.

The light waveguides described above as optical fibers. However, other waveguide arrays may be substituted. For example, the arrays of optical waveguides may comprise optical integrated circuits (OICs) where parallel waveguides are formed in a common substrate such as lithium niobate or glass. The term "waveguide" used herein is intended to include any suitable light guiding element.

The placement of the optical fibers, both for the input side and the output side may vary significantly. In the embodiments of FIGS. 2 and 4, the mirror rotates around a single axis. Accordingly the optical fibers in the arrays are arranged in a single parallel plane. However, with biaxial rotation of the mirror, basically any x-y array configuration may be used.

As mentioned earlier, the devices described above may be used as wavelength selective devices in any application requiring that function. The embodiment shown in FIG. 6 for example shows four input ports and one output port. Many optical channels may be introduced into the input ports 42-45 while only a single wavelength exits at the output port 51. For this application the tilt of the reflector element 49 is adjusted in two axial orientations to pass only the channel selected. It then remains fixed until a different selection is needed.

The device of FIG. 6 is shown as an n×1 device. However, it may also be easily modified to produce a 1×n device. Therefore the recited inputs and the output may be interchanged.

A wide variety of applications exist for wavelength selective devices. For example, channel selectors in TV transmission and display require a single channel to be selected among a large number of channel options. Recognizing that the reflector element can itself provide added functionality, optical systems may be employed in which the reflector is tilted to transmit a predetermined sequence of wavelengths. These may be used in coding devices.

In the embodiments described above, the reflector is tilted with respect to the diffraction element to achieve wavelength selectivity. However, devices may be designed in which the diffraction element is moved and the reflector is fixed. Likewise other optical elements, for example, lenses, may be used to achieve the same effect. All arrangements in which some controlled predetermined movement of a diffraction element with respect to a reflector or refractive element to achieve the purpose of the invention should be considered equivalent.

In concluding the detailed description it is evident that various additional modifications of this invention may occur to those skilled in the art. All deviations from the specific teachings of this specification that basically rely on the principles and their equivalents through which the art has been advanced are properly considered within the scope of the invention as described and claimed.

The invention claimed is:
1. An optical device comprising:
    input and output ports;

a light dispersion element positioned in optical paths of light transmitted to and from the ports, the light dispersion element being configured to disperse the light into light components; and a light reflecting element for reflecting light components from the light dispersion element and back to the light dispersion element, the light reflecting element being configured to rotate about a first axis to select one of the light components for output, and about a second axis to select an output port for the selected light component and to direct the selected light component to the selected output port.

2. The optical device of claim 1, wherein the amount of rotation of the light reflecting element about the second axis is controlled to direct the selected light component to one of the output ports.

3. The optical device of claim 1, wherein the input and output ports comprises input and output waveguides.

4. The optical device of claim 3, wherein the waveguides are arranged in a linear array.

5. The optical device of claim 3, wherein the waveguides are arranged in a two-dimensional array.

6. The optical device of claim 1, wherein the light dispersion element disperses light passing therethrough in the direction of the reflecting element into the light components.

7. The optical device of claim 6, wherein the light components comprise wavelength components of the light passing through the light dispersion element.

8. The optical device of claim 1, wherein the first and second axes are orthogonal.

9. A method of filtering and switching an optical signal in an optical device having multiple input and output ports, comprising:

transmitting an optical signal through one of the ports;

dispersing the optical signal into light components;

rotating a reflective element about a first axis to select one of the light components for output; and rotating the reflective element about a second axis to select an output port for the selected light component and to direct the selected light component to the selected output port.

10. The method of claim 9, wherein the first and second axes are orthogonal.

11. The method of claim 9, wherein the optical ports are arranged in a linear array.

12. The method of claim 9, wherein the optical ports arranged in a two-dimensional array.

* * * * *